United States Patent [19]

Wedemeyer

[11] Patent Number: 4,730,926
[45] Date of Patent: Mar. 15, 1988

[54] ACCU-RIGHT MIRROR ALIGNMENT SYSTEM

[75] Inventor: Gerald T. Wedemeyer, Manhattan, Kans.

[73] Assignee: Lowell R. Wedemeyer, Davis, Calif.; a part interest

[21] Appl. No.: 891,467

[22] Filed: Jul. 28, 1986

[51] Int. Cl.⁴ ............................................. G01B 11/26
[52] U.S. Cl. .................... 356/138; 356/139; 356/153; 356/154; 33/264; 33/286
[58] Field of Search ............... 356/138, 139, 153, 154; 33/264, 286

[56] References Cited

U.S. PATENT DOCUMENTS

| | | | |
|---|---|---|---|
| 3,565,566 | 7/1967 | Wetzel | 3/263 |
| 3,657,821 | 4/1972 | De Nure | 3/263 |
| 4,257,706 | 3/1981 | Smith | 356/3 |

*Primary Examiner*—R. A. Rosenberger
*Assistant Examiner*—S. McGowan
*Attorney, Agent, or Firm*—Lowell R. Wedemeyer

[57] ABSTRACT

A method, and a device for practicing the method, for marking the configuration of a vehicle-mounted mirror which has initially been set to a desired perspective, thus enabling a single, unaided person within reach of a misaligned mirror to quickly and reliably readjust it to reproduce the previously marked perspective even though that desired perspective cannot be viewed from the adjuster's position.

10 Claims, 8 Drawing Figures

U.S. Patent  Mar. 15, 1988  Sheet 1 of 3  4,730,926
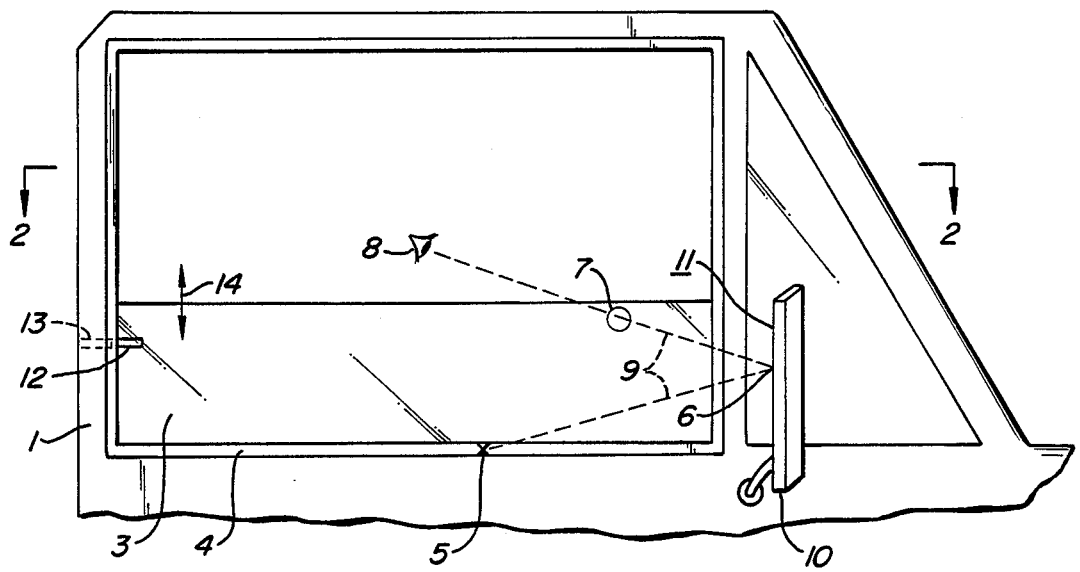
FIG._1.
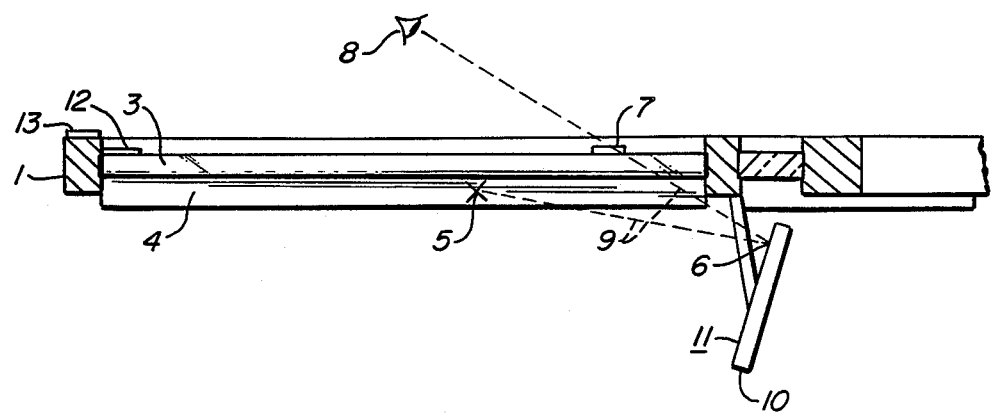
FIG._2.

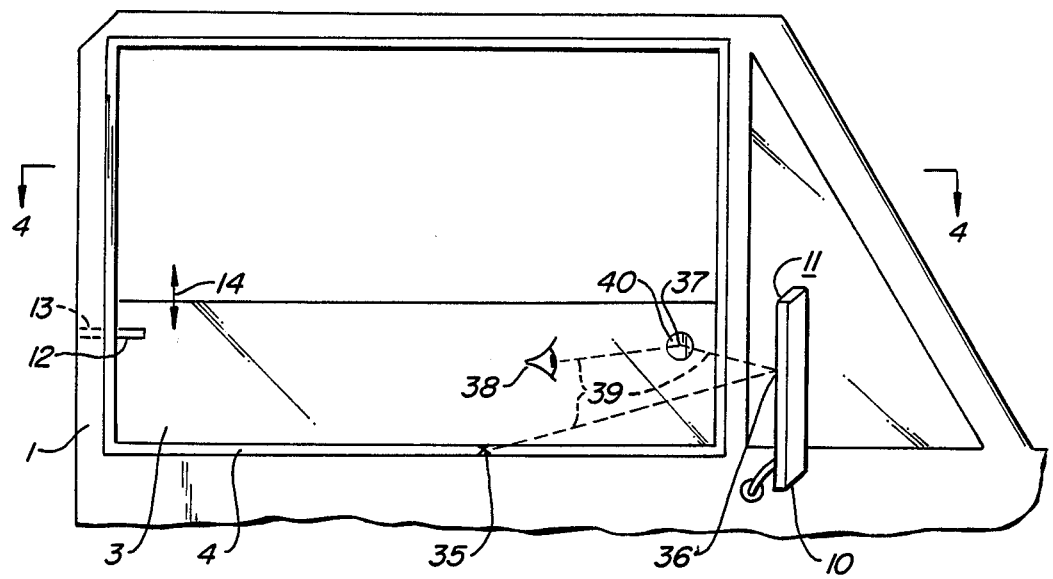
FIG._3.
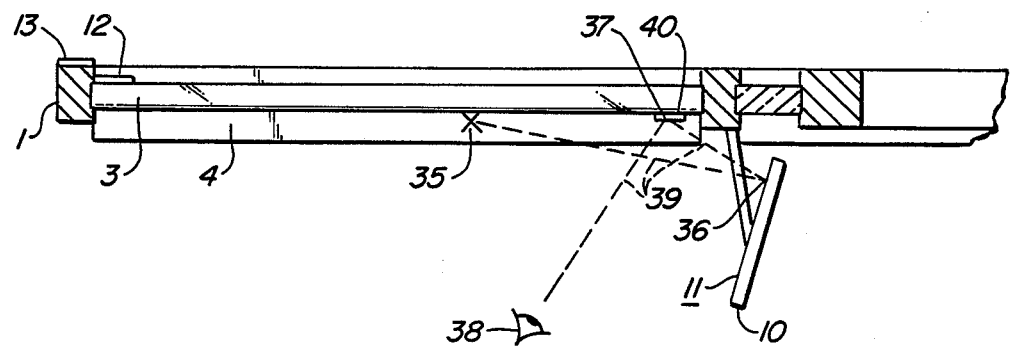
FIG._4.

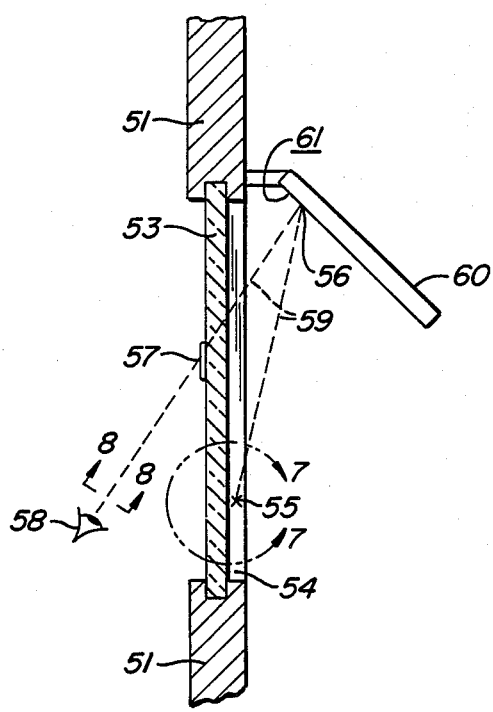
FIG._5.
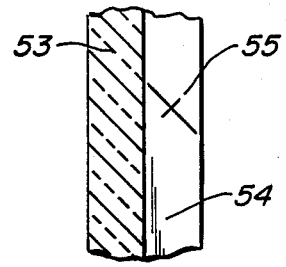
FIG._7.
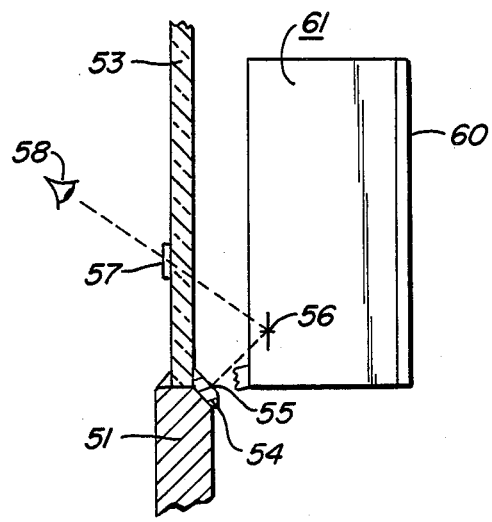
FIG._6.
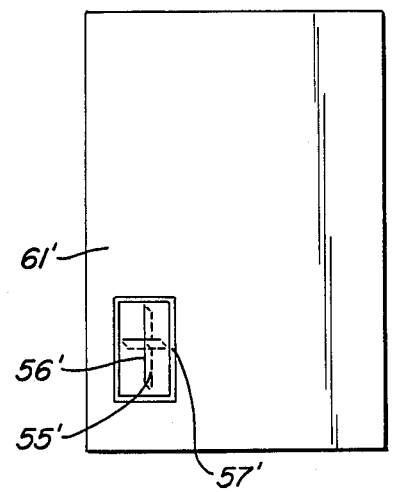
FIG._8.

ACCU-RIGHT MIRROR ALIGNMENT SYSTEM

The field of this invention is alignment of vehicle-mounted mirrors.

Vehicles commonly have mirrors mounted on them to provide the operator or other occupant of the vehicle with views to the rear and sides of the vehicle not otherwise within the field of vision. Automobiles and trucks commonly have two external mirrors, one on the "driver's side" and a more remote mirror on the "passenger's side." These mirrors usually are adjustable because the desired setting of a mirror is determined by the needs and preferences of the particulr operator. Such mirrors frequently require re-alignment because they are accidentally knocked or jarred out of the desired setting, or because the vehicle is operated by more than one person and each desires a different setting.

The driver's side mirror commonly is within ready reach from the driver's seat and so is susceptible of quick, unaided adjustment in which the driver can see the reflected image from the point of view of the driver's seat during the course of the adjustment. However, the passenger side mirror usually is more remote, out of easy reach of a person sitting in the driver's seat. Thus, it is difficult if not impossible for one person to view the driver's perspective while simultaneously twisting the remote passenger side mirror into the desired setting. As a consequence, re-setting the passenger side mirror requires the cooperation of two persons, one in the driver's seat and one twisting the mirror according to directions from the person in the driver's seat. Alternatively, the setting of the remotely mounted mirror requires that a single person engage in a series of time-consuming, frustrating trial and error adjustments while moving back and forth between the view from the driver's seat and the remote mirror.

Many mirrors are mounted on a ball joint which effectively gives such mirrors three axes of rotational adjustment motion—roll, pitch and yaw. The range of mirror adjustment sometimes is increased by mounting the mirror on an arm with a ball joint, and then mounting the arm on the vehicle with another ball joint.

It can be frustrating to find a cooperative person to adjust a mirror because the concepts of roll, pitch and yaw needed to describe the three dimensional motions for adjustment of a mirror are not used or understood in common, non-technical parlance. Hand signals commonly are misinterpreted and adjustment directions, whether verbal or by hand motions, are unquantified because very few persons have or can convey a sense of motion in degrees of roll, pitch or yaw.

Even with larger mirrors commonly used on trucks which have rotation joints at the upper and lower sides, and correspondingly restricted degrees of freedom for adjustment, an adjustment instruction must be described in degrees of rotational motion.

It is an objective of this invention to mark a desired setting of a vehicle mounted mirror in such a fashion that a single, unaided person from a position within easy reach of a remotely mounted mirror can quickly and reliably re-align that mirror to provide the desired remote perspective at the driver's seat without using the trial and error method. This objective currently is being achieved by expensive, complicated electromechanical devices attached to the mirrors which allow mirrors to be adjusted from a switch at the driver's seat. However, many vehicles do not have such mirror-adjusting devices.

In addition, it is difficult to adjust the mirror of a parked vehicle to the best perspective for use in driving on modern, multi-lane highways because when the vehicle is parked one must guess at the best perspective for driving. Again, any mirror which is out of reach of the driver's seat must either be adjusted by trial and error, by alternately pulling over to set the mirror and driving the vehicle to check the perspective, or the remote mirror must be adjusted by the driver while driving which impairs the driver's attention to the road and traffic, or must be adjusted by obtaining cooperation of another person to twist the mirror according to instructions from the driver while driving.

Accordingly, it is an objective of this invention to mark a desirable setting of a vehicle-mounted mirror so that when a desirable perspective has once been set, that perspective can be perserved by marks so that the mirror thereafter can reliably be restored to that desirable perspective even though that desirable perspective is not visible from the position of the person who is re-adjusting the mirror.

It is a further objective of this invention to provide a simple, inexpensive method for restoring adjustment of mirrors. An advantage of this invention is that it can be practiced by means of an inexpensive marker kit and application instructions which can be applied as a retro-fit to existing vehicles by non-experts, as well as supplied with new vehicles.

A feature of this invention is that it enables re-adjustment of a mirror solely by eye-hand coordination of a single individual. It is an advantage of this invention that a mirror can be readjusted without need to verbalize, quantify, translate into hand signals, or otherwise to communicate instructions as to the three-dimensional motions necessary to adjust a mirror.

A feature of this invention is that each combination of three marks on the vehicle, on the mirror, and on the window pane, respectively, defines a unique orientation of the mirror and a change of any one of the three marks defines a unique new orientation. As a consequence, an advantage of this invention is that a series of unique orientations can be marked by use of two fixed marks with a series of marks from which to select the third mark. For example, with a single mark on the vehicle, a single mark on the mirror, and two marks on the window pane, one could mark two unique mirror positions, one for the husband and one for the wife, so each could re-adjust mirrors to personal preference on a commonly-used vehicle. A further advantage of this invention is that two of the three marks can be installed by a manufacturer, or other experienced person, thus requiring the ultimate user only to apply the third mark, or to choose the third mark from amongst a series of possible third marks installed by the manufacturer, in accord with the ultimate user's preferred mirror orientations.

A feature of this invention is that while a given set of three marks determines a unique mirror orientation, that same unique orientation can be marked by an infinite series of different combinations of three marks. An advantage of this invention, therefore, is that it is almost universally adaptable to any mirror which is mounted to be viewed through a transparent, or semi-transparent pane. Thus, the invention can be applied to mirrors mounted on fixed or stationary booths as well as to motor vehicles. A further advantage is that a combination of three marks can be chosen which is comfortable for the particular person who will be using the mirror. A further advantage is that, with some planning, the three marks can all be sited in inconspicuous places on the vehicle, mirror and window pane so as not to mar appearance or impair function.

It is evident that for some of the several marks, one could choose a distinctive mark already present on the surface rather than adding a new mark. For example, one could use a corner of the mirror, a corner of the window pane, a flaw in the window glass or in the mirror, or a corner on the vehicle's chrome trim.

Many surfaces of a vehicle have some degree of light-reflective or mirroring properties, such as, for example, the chrome trim. Consequently, one frequently can find a poorly defined but recognizable image of some portions of the mirror itself reflected from some other shiny surface of the vehicle such as the chrome trim. If a mark of sufficiently high contrast is placed on the mirror's reflective surface, then a recognizable, reflected image of that mark on the mirror can be found on the chrome trim. In this situation, the superpositioning of the three images can be achieved by placing the mark on the mirror first, then finding its reflected image on the chrome trim and superimposing a second mark on the chrome trim, and then circling on the window pane the superimposed images of the two marks on the chrome trim and the mirror. This permits the installation of a mirror with a mark already placed on its reflective surface at a spot calculated to make it easy to find the mirror mark's reflection on the chrome trim, or other selected shiny surface. This pre-marked mirror can greatly increase the ease of use of the invention by the untutored public.

SUMMARY OF THE INVENTION

The invention consists of a method, and a device for practicing the method, of positioning three marks on a vehicle, on a mirror mounted on the vehicle, and on a window pane in the vehicle, such that the images of three marks, as seen by a person re-adjusting the mirror, are superimposed when the mirror is in a desired configuration. The mirror initially is set to achieve the perspective desired at the driver's seat or other position from which the mirror is to be viewed in use. An adjuster's position is chosen within reach of the mirror. The three marks are placed into positions which superimpose the images of the three marks when viewed from the adjuster's position.

Thereafter when the desired configuration is to be restored, a single, unaided person resumes the adjuster's position and twists the mirror to superimpose the images of the three marks as viewed from the adjuster's position, thereby reproducing the desired perspective at the more remote point from which the mirror is to be viewed in use.

BRIEF DESCRIPTION OF DRAWINGS

FIG. 1 illustrates the mirror-alignment invention with an externally mounted mirror and the adjuster's position inside the vehicle.

FIG. 2 is a cross-sectional plan view further illustrating the invention depicted in FIG. 1.

FIG. 3 is a plan view illustrating the invention with both the mirror and the adjuster's position outside the vehicle.

FIG. 4 is a cross-sectional plan view further illustrating the invention as depicted in FIG. 3.

FIG. 5 is a cross-sectional plan further illustrating details of the three mirror-alignment marks.

FIG. 6 is a cross-sectional elevation view seen from the rear of the vehicle door depicted in FIG. 5.

FIG. 7 is an expanded view of the alignment mark 55 depicted in FIG. 5.

FIG. 8 depicts superposed adjustment mark images as seen from adjuster's position 58 in FIG. 5.

DETAILED DESCRIPTION OF INVENTION

FIG. 1 is an elevation view of a vehicle door, showing first alignment mark (cross mark) 5 on vehicle surface (chrome trim) 4 on the frame 1; second alignment mark (dot) 6 on reflective surface 11 of vehicle-mounted mirror 10; and third alignment mark (bulls' eye) 7 on window pane 3. Dotted lines 9 mark the path of light rays from first alignment mark 5 to the viewpoint at adjuster's position 8, located on the opposite side of window 3 from mirror 10, where the images of the first, second and third alignment marks appear to be superposed. Windowpane 3, which is movable as indicated by double arrow 14, bears fourth alignment mark 12 and frame 1 bears fifth alignment mark 13.

FIG. 3 is an elevation view of the same vehicle door, but substituting first aligment mark 35 on vehicle surface 4, second alignment mark 36 on mirror ten, and film 40 bearing third alignment mark 37 on window 3. A light ray traces the path of dotted lines 39 from first alignment mark 35 to the viewpoint at adjuster's position 38, which is on the same side of window 3 as is mirror 10, where the three alignment marks appear to be superposed. FIG. 4 is a cross-sectional view along line 2—2 of FIG. 3. The film 40, bearing third alignment mark 37, can be semi-transparent, semi-reflective, to improve the reflectively of the window pane without blocking a vehicle occupant's vision therethrough.

FIG. 5 is a schematic plan view looking down at the upper edge of a vehicle window and mirror. FIG. 6 is a schematic elevation view of a side edge of that same vehicle window and mirror. FIG. 5 shows the window frame 51, the window pane 53, the first alignment mark 55 positioned on the chrome stripe 54, the second alignment mark 56 on the reflective surface 61 of the mirror 60, the third alignment mark 57 on the window pane 53, the adjuster's position 58, and the paths of the light 59.

FIG. 7 shows an expanded view of the mark 55 on the chrome strip 54.

FIG. 8 shows an enlarged schematic view of the superposed first, second and third alignment images seen from the adjuster's position 58 as indicated by lines 8—8 in FIG. 5. It shows the image 61' of the reflective surface 61 of mirror 60, the image 57' of the rectangular third alignment mark 57 on the window pane, the image of second alignment mark 56' on the reflective surface 61 of the mirror, the image 57' of the first alignment mark on the chrome strip 54, and the image 55' of the first alignment mark 55 indicated as dotted lines slightly offset from image 56'. The rectangular third alignment mark 57 is used as a sighting outline into which the images 55' and 56' of the first and second alignment marks are maneuvered into superposition.

DESCRIPTION OF EMBODIMENTS AND MODE OF USE

The invention is embodied in an adhesive-backed cross-mark adapted to adhere to metallic, exterior vehicle trim. A felt-tipped pen is used to place a dot or other mark on the mirror and to draw a viewing rectangle or a "bull's eye" on the window pane through which the adjuster looks to superimpose the image of the dot over the image of the cross-mark within the viewing rectangle or bull's eye.

When standing outside the vehicle within reach of the passenger side mirror one usually can see secondarily reflected from the surface of the window pane a primary reflection from the mirror of a first mark placed on the vehicle surface. The first mark is placed by positioning oneself within reach of the mirror and, while looking into the image of the mirror reflected on the surface of the window pane, moving a finger tip along the vehicle's trim on the lower edge of the window until the secondarily reflected image of the finger tip appears to be primarily reflected from an inconspicuous spot on the inner edge or lower inside corner of the mirror. The cross-mark then is placed at the finger tip's actual location on the trim. Then, looking at the secondarily reflected image of the cross-mark on the window pane, the dot is placed on the mirror so that it's image primarily reflected on the window pane appears superimposed over the image of the cross-mark secondarily reflected on the window pane. Finally, looking at the window pane, one makes a circle on the window pane around the superimposed primarily reflected image of the dot and secondarily reflected image of the cross-mark. One retains the same position within reach of the mirror throughout the process of placing the marks, moving only the arms to site and place the cross-mark, dot and circle. One can, of course, briefly look at the trim and the mirror to guide one's hands into position and to actually place the marks, but final verification of superpositioning in each case must be made with the images seen when looking at the window pane. The reflections from the window pane can be greatly increased if a reflective film is adhered to the window pane at the position where the secondary reflection is desired. Semi-transparent, semi-reflective films which permit vehicle occupants to see out, but which reflect much of the external light impinging on the window pane are commercially available and presently in use on many vehicles. Applicant is informed and believes that 3M Corporation manufactures such a semi-transparent, semi-reflective film.

It is desireable in some mirror adjustments to more finely control rotation in the plane of the mirror about the mark placed on the mirror. This can be achieved by endowing the alignment mark on the mirror and at least one of the other two alignment marks with mutually-alignable asymmetries so that each asymmetries will be superimposed when the mirror is in the desired position. For example, the mark and one of the other two marks could be ovals, with each oval having a longer and shorter axis, placed so that the longer axes of the two marks appear from the adjuster's position to be superimposed when the mirror is properly aligned. As a further example, the mark on the mirror could be a cross and the bull's eye on the window pane could have crosshairs which align with the cross on the mirror when the mirror is in the desired adjustment. Detail 8 shows an example where the first and second marks both are crosses having one pair of arms longer than the other pair, thus permitting aligment of the respective shorter and longer arms of the two crosses.

The fourth and fifth alignment marks which identify the position of the partially open window pane can be dispensed with if the window pane is set in the fully closed position for purposes of initially placing the marks and thereafter for purposes of re-aligning the superimposed images for mirror adjustment.

The inventor's conception is that the marks can be printed on transparent or semi-transparent, adhesive-backed, waterproof film which can be placed on a vehicle surface, on the mirror and on the window pane without substantially impairing their visual properties or otherwise damaging them.

I claim:

1. A method of enabling one unaided person to restore a desired setting of a mirror that is externally mounted on a vehicle for a vehicle occupant's view through the vehicle's window pane, comprising:
I. Initially setting the mirror in the desired configuration;
II. Identifying an adjuster's position from which a person wishing to restore the desired setting of the mirror:
   A. can reach the mirror to adjust it, and
   B. can see through the window pane an image of some portion of the vehicle reflected in said mirror; and
III. Placing a first alignment mark on the vehicle, which first alignment mark is positioned to make a reflected image thereof visible in said initially-set mirror to a person in said adjuster's position; and
IV. Placing a second alignment mark on said mirror, superimposed on the reflected image in said mirror of said first alignment mark, viewed from the adjuster's position looking into said mirror;
V. Placing a third alignment mark on said window pane, positioned to simultaneously superimpose the images of said first, second and third marks when viewed by a person in said adjuster's position looking into said mirror; and
VI. Thereafter restoring said desired initial setting of the mirror, as needed, by moving the mirror to superimpose the images of said first, second and third marks, viewed from the adjuster's position looking into the mirror.

2. A method for adjusting vehicle mounted mirrors, as recited in claim 1, for use where said vehicle window pane is movable, further comprising:
I. Setting said window pane into an initial alignment position prior to placing said third alignment mark thereon, in which initial alignment position of said movable window pane:
   A. The image of said reflection of said first mark is visible through said window pane to a person in the adjuster's position, and
   B. Said window pane does not block the reach of a person in said adjuster's position to adjust said mirror; and
II. Placing a fourth alignment mark on said movable window pane adjacent to an edge thereof; and
III. Placing a fifth alignment mark on the vehicle immediately adjacent to and aligned with said fourth alignment mark when said movable window is in said initial alignment position; and
IV. Thereafter restoring said movable window to said initial alignment position by re-aligning said fourth and fifth alignment marks during the course of restoring the desired setting of the mirror recited in claim 1.

3. A method of enabling one unaided person to restore a desired setting of a mirror that is externally mounted on a vehicle for a vehicle occupant's view through the vehicle's window pane, comprising:

I. Initially setting the mirror in the desired configuration;
II. Identifying an adjuster's position from which a person wishing to restore the desired setting of the mirror:
   A. can reach the mirror to adjust it, and
   B. can see secondarily reflected on the window pane an image primarily reflected from the mirror of some portion of the vehicle; and
III. Placing a first alignment mark on the vehicle, which first alignment mark is positioned to make a reflected image thereof visible on the window pane to a person in said adjuster's position, by secondary reflection of said first mark on the window pane from primary reflection thereof by the initially-set mirror; and
IV. Placing a second alignment mark on said mirror, superimposed on the primarily reflected image in said mirror of said first alignment mark, viewed from the adjuster's position looking at the secondary of said first alignment mark on said window pane;
V. Placing a third alignment mark on said window pane, positioned to simultaneously superimpose the images of said first, second and third marks when viewed by a person in said adjuster's position looking at the reflection of said mirror on said window pane; and
VI. Thereafter restoring said desired initial setting of the mirror, as needed, by moving the mirror to superimpose the images of said first, second and third marks, viewed from the adjuster's position looking at the reflection on said window pane from said mirror.

4. A method for adjusting a vehicle mounted mirror, as recited in claim 3, for use where said vehicle window pane is movable, further comprising:
I. Setting said window pane into an initial alignment position prior to placing said third alignment mark thereon, in which initial alignment position of said movable window pane:
   A. The secondarily first reflected image of said first mark is visible on said window pane to a person in the adjuster's position; and
II. Placing a fourth alignment mark on said movable window pane adjacent to an edge thereof; and
III. Placing a fifth alignment mark on the vehicle immediately adjacent to and aligned with said fourth alignment mark when said movable window is in said initial alignment position; and
IV. Thereafter restoring said movable window to said initial alignment position by re-aligning said fourth and fifth alignment marks during the course of re-aligning the mirror as recited in claim 3.

5. A method, as recited in claim 1, further comprising:
A. endowing said second alignment mark and at least one of said first and third alignment marks with shapes that appear to have mutually aligned asymmetries in the plane of the mirror's reflective surface when the image of said marks appear in the view from the adjuster's position to be superimposed as recited in claim 1.

6. A method, as recited in claim 3, further comprising:
A. endowing said second alignment mark and at least one of said first and third alignment marks with shapes that appear to have mutually aligned asymmetries in the plane of the mirror's reflective surface when the images of said marks appear in the view from the adjuster's position to be superimposed as recited in claim 3.

7. A device for practicing a method for restoring alignment of a vehicle-mounted mirror, comprising:
I. A first mark
   A. adapted to application on a vehicle surface in a position making a reflected image thereof visible in the mirror to a person within adjusting reach of the mirror; and
   B. having a shape, color and size adapted when so applied to produce a reflected image thereof, from the mirror to a person within adjusting reach of the mirror, which image is
      i. visibly distinct against the background,
      ii. small relative to the total reflective area of the mirror, and
      iii. not substantially obstructive to the reflective image provided by the mirror to a user thereof; and
II. a second mark
   A. adapted to application to the reflective surface of a vehicle-mounted mirror in a position to be visible thereon to a person within adjusting reach of the mirror; and
   B. having a shape, color and size adapted when so applied to produce an image thereof to a person within adjusting reach of the mirror which image is
      i. visibly distinct against the background,
      ii. small relative to the total reflective area of the mirror,
      iii. not substantially obstructive to the reflective image provided by the mirror to a user thereof; and
      iv. visibly superimposable over a reflected image of said first mark in said mirror; and
III. a third mark
   A. adapted to be applied to the surface of a vehicle window pane in a position to be visible thereon, to a person within adjusting reach of the mirror, simultaneously with images of said applied first and second marks; and
   B. having a shape, color and size adapted when so applied to produce an image thereof to a person within adjusting reach of the mirror which image is
      i. visibly distinct against the brackground,
      ii. small relative to the total reflective area of the mirror,
      iii. not substantially obstructive to the reflective image provided by the mirror to a user thereof;
      iv. not substantially obstructive to user views through the window pane, and
      v. visibly simultaneously superimposable over
         a. a reflected image in said mirror of said first mark applied to the vehicle surface, and
         b. said second mark applied on said mirror's reflective surface.

8. A device, as recited in claim 7, further comprising:
A mirror adapted to be mounted on a vehicle with said second mark applied thereon as recited in claim 7.

9. A device, as recited in claim 7, further comprising:
A reflective film adapted to be mounted on the vehicle window pane at the position of said third mark.

10. A device, as recited in claim 7, further comprising:
A. said second alignment mark further adapted to have an asymmetric appearance in the plane of the mirror's reflective surface when positioned on the mirror's reflective surface and viewed from said adjuster's position as recited in claim 7; and
B. at least one of said first and third alignment marks further adapted to have an asymmetric appearance which is mutually aligned with said asymmetric appearance of said second alignment mark when the images of said marks appear to be superimposed when viewed from said adjuster's position as recited in claim 7.

* * * * *